United States Patent
Dalal et al.

[19]

[11] Patent Number: 6,127,842

[45] Date of Patent: Oct. 3, 2000

[54] MODIFIED ADDER TREE STRUCTURE AND METHOD USING LOGIC AND GATES TO GENERATE CARRY-IN VALUES

[75] Inventors: Parin B. Dalal, Milpitas; Steve Hale, San Jose; Stephen C. Purcell, Mountain View; Nital Patwa, San Jose, all of Calif.

[73] Assignee: ATI International SRL, West Indies, Barbados

[21] Appl. No.: 09/344,912

[22] Filed: Jun. 24, 1999

[51] Int. Cl.[7] .................................................. H03K 19/173
[52] U.S. Cl. ............................... 326/38; 326/53; 327/361
[58] Field of Search ........................ 326/38, 53; 327/355, 327/361

[56] References Cited

U.S. PATENT DOCUMENTS

| | | | |
|---|---|---|---|
| 5,539,332 | 7/1996 | Schmookler | 365/53 |
| 5,818,255 | 10/1998 | New et al. | 365/53 |

*Primary Examiner*—Tan T. Nguyen
*Attorney, Agent, or Firm*—Skjerven Morrill MacPherson LLP; Edward C. Kwok

[57] ABSTRACT

In accordance with the present invention, an adder tree structure includes at least two adder stages. In the circuit and method according to the present invention, the first of the two adder stages generates two bits of a common weight and other more significant bits of a weight one bit more significant than the two bits of the common weight. The second of the two adder stages includes an adder that receives the more significant bits generated in the first of the two adder stages. The second adder stage also includes an AND gate which receives and logically AND's the two bits of the common weight to generate a carry-in bit for the adder in the second stage. The above adder tree structure and adding method have an advantage of permitting more input terminals of adders to contain information about the input values to the adder tree structure. Therefore, the adders are used more efficiently and less adders are required to perform a specific function.

9 Claims, 3 Drawing Sheets

MODIFIED ADDER TREE STRUCTURE AND METHOD USING LOGIC AND GATES TO GENERATE CARRY-IN VALUES

BACKGROUND OF THE INVENTION

Wallace tree structures are well-known adder tree structures in the art and are used in a variety of application. Each Wallace tree is composed of several basic adder units positioned in several stages.

One Wallace tree structure implements a 4:2 adder as a basic adder unit. This unit has five input terminals for receiving bits of a common weight and has three output terminals, one representing a sum value and the other two terminals representing carry-out values in redundant form. In the conventional Wallace tree structure, many of the input terminals to various basic adder units are forced to carry a zero bit value resulting in a Wallace tree structure that occupies significant area. It is desirable to reduce this circuit area.

SUMMARY OF THE INVENTION

In accordance with the present invention, an adder tree structure includes at least two adder stages. In the circuit and method according to the present invention, the first of the two adder stages generates two bits of a common weight and other more significant bits of a weight one bit more significant than the two bits of the common weight. The second of the two adder stages includes an adder that receives the more significant bits generated in the first of the two adder stages. The second adder stage also includes an AND gate which receives and logically AND's the two bits of the common weight to generate a carry-in bit for the adder in the second stage.

The above adder tree structure and adding method permit more input terminals of adders to contain information about the input values to the adder tree structure. In other words, fewer input terminals of the adders of the adder tree structure are forced to ground thereby containing no information about the input values to the adder tree structure. Therefore, the adders are used more efficiently and less adders are required to perform a specific function.

The present invention will be more fully understood in view of the following drawings taken together with the detailed description.

BRIEF DESCRIPTION OF THE DRAWINGS

FIG. 4 is a schematic diagram of the basic adding unit of the tree structures of FIGS. 1, 2 and 3.

DETAILED DESCRIPTION OF THE INVENTION

The following description refers to several figures. Throughout the description and figures, the same or similar elements are referred to with common reference symbols.

Figure 1:
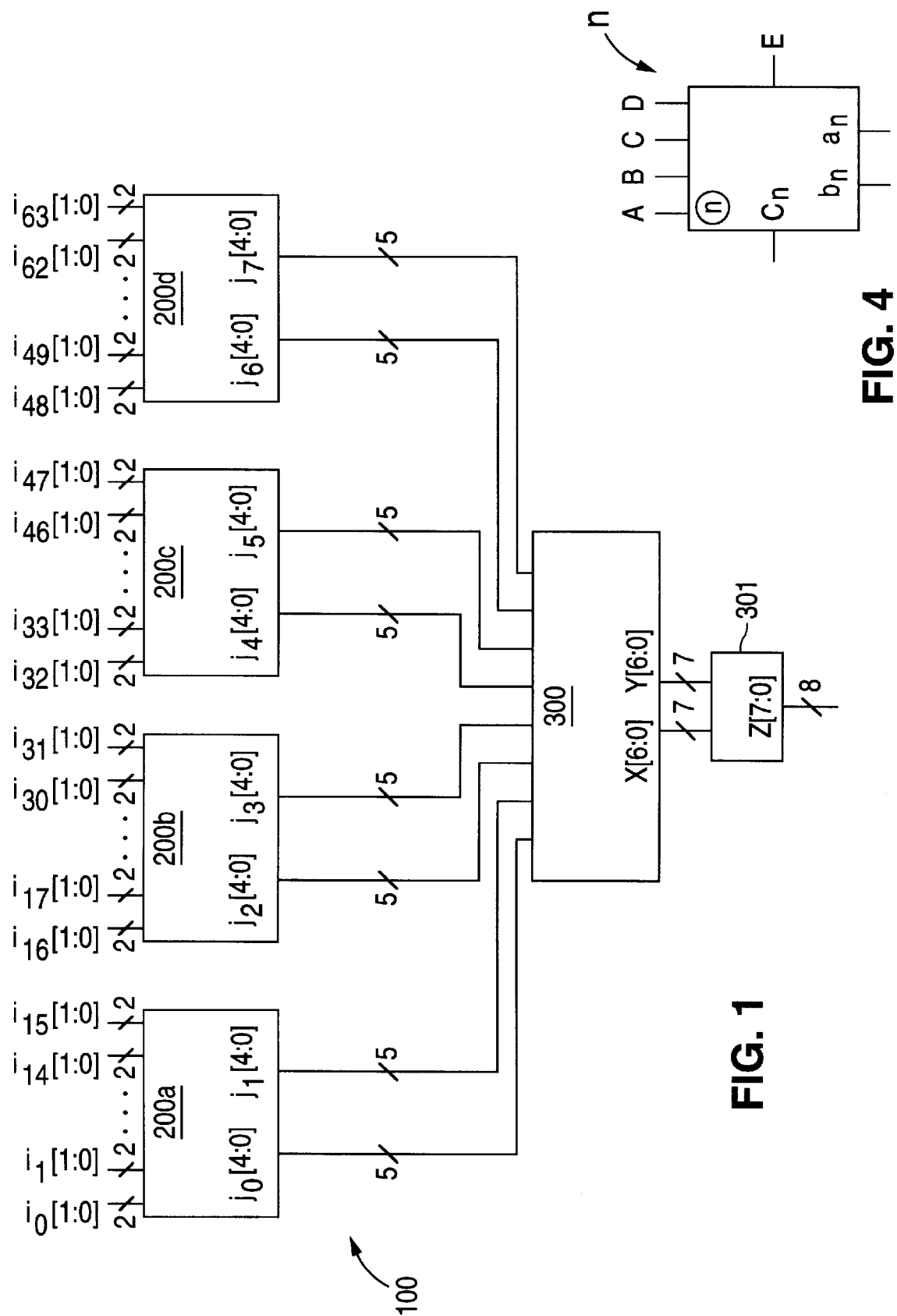
FIG. 1 is a schematic diagram of a modified Wallace tree according to the present invention.

FIG. 1 is a schematic diagram of a modified Wallace tree 100 ("tree 100") according to the present invention. The basic unit of tree 100 is the 4:2 adder shown in FIG. 4. Referring to FIG. 4, each adder n is configured to receive 5 input bits (e.g., A, B, C, D and E) and to generate bit an of the common weight and carry-out bits $b_n$ and $c_n$ according to the following Table 1.

TABLE 1

| # of values A, B, C, D, and E which equal one | $a_n$ | # of values of $b_n$ and $c_n$ that equal one |
|---|---|---|
| 0 | 0 | 0 |
| 1 | 1 | 0 |
| 2 | 0 | 1 |
| 3 | 1 | 1 |
| 4 | 0 | 2 |
| 5 | 1 | 2 |

Thus, if bits A, B, C, D and E are of a common weight, bit $a_n$ represents a sum bit of the common weight, while bits $b_n$ and $c_n$ represent carry bits one bit more significant than the common weight. Tree 100 works with any 4:2 adder configured according to Table 1.

Referring again to FIG. 1, tree 100 is configured to compress and add 64 two bit values $i_0[1:0]$, $i_1[1:0]$, ..., $i_{62}[1:0]$ and $i_{63}[1:0]$ into an eight bit sum value $z[7:0]$. Tree 100 contains four preliminary adders 200a, 200b, 200c and 200d, which feed five bit sum values (e.g., bits $j_0[4:0]$, $j_2[4:0]$, $j_4[4:0]$ and $j_6[4:0]$, respectively) and carry values (e.g., bits $j_1[4:0]$, $j_3[4:0]$, $j_5[4:0]$ and $j_7[4:0]$, respectively to a final adder 300. The final adder 300 compresses the 4 five bit sum values and the 4 five bit carry values into a single sum value $y[6:0]$ and a single carry value $x[6:0]$. A 2:1 adder tree 301 adds the sum and carry value together to generate the final sum value $z[7:0]$.

Figure 2:
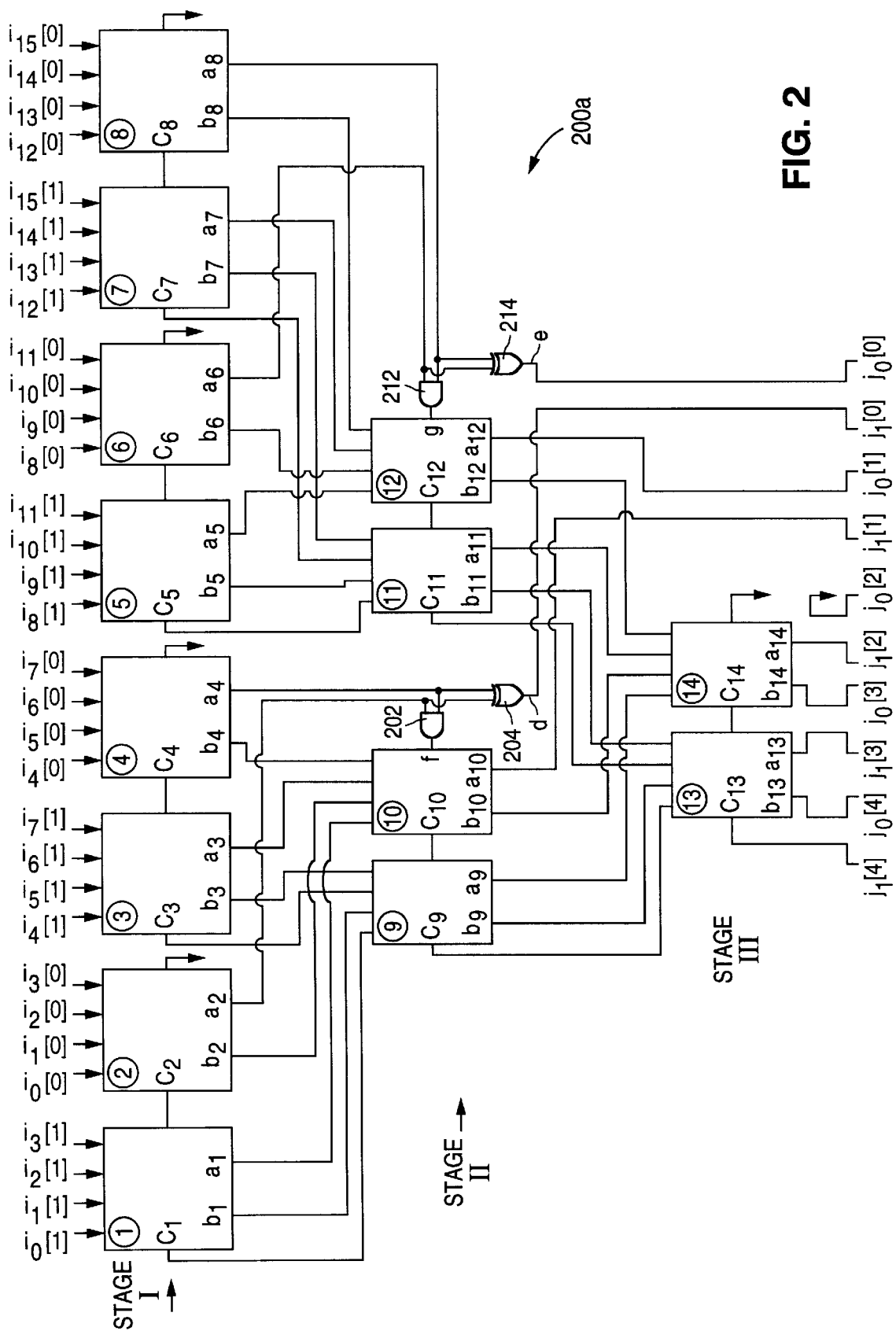
FIG. 2 is a circuit diagram of the preliminary adder of FIG. 1.

The details of preliminary adder 200a are described with reference to FIG. 2. Adder 200a includes fourteen 4:2 adders labeled, respectively, 1–14 in the upper left corners of the adders. Adder 1 receives the more significant bits $i_0[1]$, $i_1[1]$, $i_2[1]$ and $i_3[1]$ and adder 2 receives the less significant bits $i_0[0]$, $i_1[0]$, $i_2[0]$ and $i_3[0]$ of 4 two bit values $i_0[1:0]$, $i_1[1:0]$, $i_2[1:0]$ and $i_3[1:0]$. The carry-in terminal of adder 2 is grounded while the carry-out bit c2 of adder 2 is received by adder 1. Each two-adder group formed by adders 3 and 4, 5 and 6, and 7 and 8 are configured to receive four of the two-bit values in a manner similar to bit groupings in adders 1 and 2. Using adders 1–8, bits a1 to a8, b1 to b8 and c1 to c8 are generated in Stage 1 of adder 200a in accordance with Table 1 and FIG. 4 and with weights according to Table 2.

TABLE 2

| Two bits more significant than bit $i_0[0]$ | One bit more significant than bit $i_0[0]$ | Common weight with bit $i_0[0]$ |
|---|---|---|
| $c_1$, $b_1$, $c_3$, $b_3$, $c_5$, $b_5$, $c_7$, $b_7$ hereinafter, "Stage 1 $2^2$ bits" | $a_1$, $b_2$, $a_3$, $b_4$, $a_5$, $b_6$, $a_7$, $b_8$ hereinafter, "Stage 1 $2^1$ bits" | $a_2$, $a_4$, $a_6$, $a_8$ hereinafter, "Stage 1 $2^0$ bits" |

In Stage 2 of adder 200a, four of the Stage 1 $2^2$ bits (e.g., bits $c_1$, $b_1$, $c_3$ and $b_3$) are received by adder 9 and four of the Stage 1 $2^2$ bits (e.g., bits $c_5$, $b_5$, $c_7$ and $b_7$) are received by adder 11. Four of the Stage 1 $2^1$ bits (e.g., bits $a_1$, $b_2$, $a_3$ and $b_4$) are received by adder 10 and four of the Stage 1 $2^1$ bits (e.g., bits $a_5$, $b_6$, $a_7$ and $b_8$) are received by adder 12.

Rather than requiring two additional 4:2 adders for receiving the stage 1 $2^0$ bits, an AND gate 202 receives Stage 1 $2^0$ bits $a_2$ and $a_4$ and generates bit f. An XOR gate 204 (or "logic unit 204") also receives Stage 1 $2^0$ bits $a_2$ and $a_4$, but generates bit d. An AND gate 212 receives Stage 1 $2^0$ bits $a_6$ and $a_8$ and generates bit g. An XOR gate 214 also receives Stage 1 $2^0$ bits $a_6$ and $a_8$, but generates bit e. Bits f and g are carried in to respective adders 10 and 12. Bits $c_{10}$ and $c_{12}$ are carried into respective adders 9 and 11. As a result, bits a9 to a12, b9 to b12, c9 to c12, e and f are created with weights according to Table 3.

TABLE 3

| Three bits more significant than bit $i_0[0]$ | Two bits more significant than bit $i_0[0]$ | One bit more significant than bit $i_0[0]$ | Common weight with bit $i_0[0]$ |
|---|---|---|---|
| $c_9$, $b_9$, $c_{11}$, $b_{11}$ hereinafter, "Stage 2 $2^3$ bits" | $a_9$, $b_{10}$, $a_{11}$, $b_{12}$ hereinafter, "Stage 2 $2^2$ bits" | $a_{10}$ and $a_{12}$ hereinafter, "Stage 2 $2^1$ bits" | d and e hereinafter, "Stage 2 $2^0$ bits" |

In Stage 3 of adder 200a, adder 13 receives all Stage 2 $2^3$ bits while adder 14 receives all Stage 2 $2^2$ bits. The carry-out bit $c_{14}$ is carried in to adder 13 while the carry-in terminal of adder 14 is grounded. Resulting bits c13, b13, a13, b14, a14, ground, a10, a12, d and e have weights as given in Table 4.

TABLE 4

| Four bits more significant than bit $i_0[0]$ | Three bits more significant than bit $i_0[0]$ | Two bits more significant than bit $i_0[0]$ | One bit more significant than bit $i_0[0]$ | Common weight with bit $i_0[0]$ |
|---|---|---|---|---|
| $c_{13}$, $b_{13}$ | $a_{13}$, $b_{14}$ | $a_{14}$, ground | $a_{10}$, $a_{12}$ | d, e |
| hereinafter, $j_1[4]$ and $j_0[4]$, respectively | hereinafter, $j_1[3]$ and $j_0[3]$, respectively | hereinafter, $j_1[2]$ and $j_0[2]$, respectively | hereinafter, $j_1[1]$ and $j_0[1]$, respectively | hereinafter, $j_1[0]$ and $j_0[0]$, respectively |

Thus, the sum of sixteen two bit values $i_0[1:0]$, $i_1[1:0]$, ..., $i_{14}[1:0]$ and $i_{15}[1:0]$ is represented by values $j_0[4:0]$ and $j_1[4:0]$.

Adders 200b, 200c and 200d may be structured similar to adder 200a. However, instead of receiving the sixteen two bits $i_0[1:0]$, $i_1[1:0]$, ..., $i_{14}[1:0]$, $i_{15}[1:0]$, adder 200b receives bits $i_{16}[1:0]$, $i_{17}[1:0]$, ..., $i_{30}[1:0]$, $i_{31}[1:0]$, adder 200c receives bits $i_{32}[1:0]$, $i_{33}[1:0]$, ..., $i_{46}[1:0]$, $i_{47}[1:0]$, and adder 200d receives bits $i_{48}[1:0]$, $i_{49}[1:0]$, ..., $i_{62}[1:0]$, $i_{63}[1:0]$. Adder 200b generates bits $j_2[4:0]$ and $j_3[4:0]$, adder 200c generates bits $j_4[4:0]$ and $j_5[4:0]$, and adder 200d generates bits $j_6[4:0]$ and $j_7[4:0]$.

Figure 3:
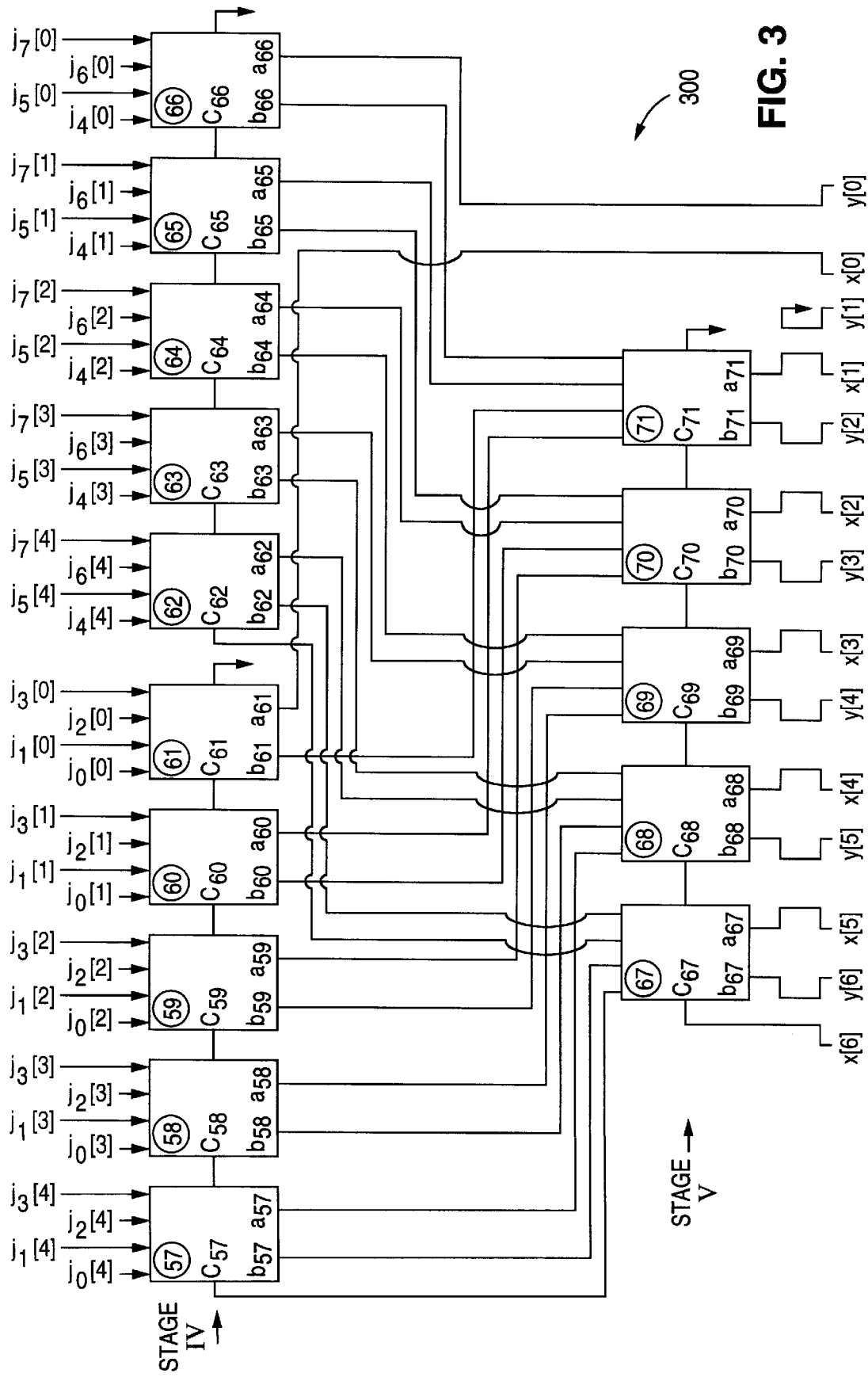
FIG. 3 is a circuit diagram of the final adder of FIG. 1.

As shown in FIG. 1 and FIG. 3, adder 300 receives values $j_0[4:0]$, $j_1[4:0]$, $j_2[4:0]$, $j_3[4:0]$, $j_4[4:0]$, $j_5[4:0]$, $j_6[4:0]$ and $j_7[4:0]$. Adder 300 contains Stage IV which has ten 4:2 adders labeled 57 to 66. Adder 57 receives four of $j_0[4]$ to $j_7[4]$ (e.g., $j_0[4]$, $j_1[4]$, $j_2[4]$ and $j_3[4]$) and adder 62 receives the remaining four of $j_0[4]$ to $j_7[4]$. Similarly, adders 58 and 63 receive bits $j_0[3]$ to $j_7[3]$, adders 59 and 64 receive bits $j_0[2]$ to $j_7[2]$, adders 60 and 65 receive bits $j_0[1]$ to $j_7[1]$, and adders 61 and 66 receive bits $j_0[0]$ to $j_7[0]$. A ripple carry chain propagates a carry bit through adders 61, 60, 59, 58 and 57, successively. Similarly, another ripple carry chain propagates a carry bit through adders 66, 65, 64, 63 and 62, successively. Stage 4 generates bits $a_{57}$ to $a_{66}$, $b_{57}$ to $b_{66}$, $c_{57}$ and $c_{62}$ with weights as in Table 5.

TABLE 5

| Five bits more significant than bit $i_0[0]$ | Four bits more significant than bit $i_0[0]$ | Three bits more significant than bit $i_0[0]$ | Two bits more significant than bit $i_0[0]$ | One bit more significant than bit $i_0[0]$ | Common weight with bit $i_0[0]$ |
|---|---|---|---|---|---|
| $c_{57}$, $b_{57}$, $c_{62}$, $b_{62}$ hereinafter, "Stage 4 $2^5$ bits" | $a_{57}$, $b_{58}$, $a_{62}$, $b_{63}$ hereinafter, "Stage 4 $2^4$ bits" | $a_{58}$, $b_{59}$, $a_{63}$, $b_{64}$ hereinafter, "Stage 4 $2^3$ bits" | $a_{59}$, $b_{60}$, $a_{64}$, $b_{65}$ hereinafter, "Stage 4 $2^2$ bits" | $a_{60}$, $b_{61}$, $a_{65}$, $b_{66}$ hereinafter, "Stage 4 $2^1$ bits" | $a_{61}$, $a_{66}$ hereinafter, "Stage 4 $2^0$ bits" |

Stage 5 has five 4:2 adders 67 to 71. Adder 67 receives all Stage 4 $2^5$ bits, adder 68 receives all Stage 4 $2^4$ bits, adder 69 receives all Stage 4 $2^3$ bits, adder 70 receives all Stage 4 $2^2$ bits, and adder 71 receives all Stage 4 $2^1$ bits. Adders 67 to 71 are connected by a rippled carry chain with the carry-in to adder 71 being ground. Stage 5 generates bits $a_{67}$ to $a_{71}$, $b_{67}$ to $b_{71}$, $c_{67}$ to $c_{71}$, $a_{61}$ and $a_{66}$ with weights as in Table 6.

TABLE 6

| Six bits more significant than bit $i_0[0]$ | Five bits more significant than bit $i_0[0]$ | Four bits more significant than bit $i_0[0]$ | Three bits more significant than bit $i_0[0]$ | Two bits more significant than bit $i_0[0]$ | One bit more significant than bit $i_0[0]$ | Common weight with bit $i_0[0]$ |
|---|---|---|---|---|---|---|
| $c_{67}$, $b_{67}$ hereinafter, "x[6]" and "y[6]", respectively | $a_{67}$, $b_{68}$ hereinafter, "x[5]" and "y[5]", respectively | $a_{68}$, $b_{69}$ hereinafter, "x[4]" and "y[4]", respectively | $a_{69}$, $b_{70}$ hereinafter, "x[3]" and "y[3]", respectively | $a_{70}$, $b_{71}$ hereinafter, "x[2]" and "y[2]", respectively | $a_{71}$, ground hereinafter, "x[1]" and "y[1]", respectively | $a_{61}$, $b_{66}$ hereinafter, "x[0]" and "y[0]", respectively |

Thus, the sum of sixty-four two bit values $i_0[1:0]$, $i_1[1:0]$, . . . , $i_{62}[1:0]$ and $i_{63}[1:0]$ is represented by values $x[6:0]$ and $y[6:0]$. 2:1 adder tree 301 (FIG. 1) receives values $x[6:0]$ and $y[6:0]$ and generates the final sum $z[7:0]$.

Throughout the description and claims, "AND gate" and "XOR gate" means any circuit capable of generating a bit representing the logical AND and XOR, respectively, of the input bits.

Although the invention has been described in connection with a specific embodiment, it is understood that this invention is not limited to the embodiments disclosed, but is capable of various modifications which would be apparent to one of ordinary skill in the art. Thus, the invention is limited only by the following claims.

We claim:

1. An adder tree structure comprising:
   first and second adder stages, the first adder stage configured to generate a first and second bit of a first weight, the first adder stage also configured to generate bits of a second weight, the second weight being one bit more significant than the first weight;
   the second adder stage comprising:
      an adder configured to receive the bits of the second weight generated in the first adder stage; and
      an AND gate configured to receive the first and second bits of the first weight, the AND gate configured to generate a carry-in bit for the adder.

2. The adder tree structure of claim 1, wherein the first stage comprises:
   a first adder configured to generate a first bit of a first weight; and
   a second adder configured to generate a second bit of the first weight,
   wherein the adder of the second adder stage is a third adder.

3. The adder tree structure of claim 2, wherein the first, second and third adders each comprises a 4:2 adder.

4. The adder tree structure of claim 1, further comprising:
   an XOR gate configured to receive the first and second bits of the first weight, the XOR gate configured to generate a third bit of the first weight.

5. The adder tree structure of claim 1, wherein the adder comprises a 4:2 adder.

6. A method of adding in a circuit comprising:
   generating first and second bits of a first weight in a first stage of an adder tree;
   generating bits of a second weight in the first stage;
   logically AND'ing the first and second bits of the first weight in a second stage of the adder tree to generate a carry-in bit; and
   adding the bits of a second weight and the carry-in bit in an adder of the second stage.

7. The method of claim 6, wherein generating the first and second bits comprises:
   generating the first bit in a first adder; and
   generating the second bit in a second adder, wherein the adder of the second stage is a third adder.

8. The method of claim 6, further comprising:
   logically XOR'ing the first and second bits of the first weight to generate a third bit of the first weight.

9. A method of providing an adder tree structure, the method comprising:
   providing first and second adder stages, the first adder stage configured to generate a first and second bit of a first weight, the first adder stage configured to generate bits of a second weight, the second weight being one bit more significant than the first weight;
   the second adder stage comprising:
      an adder configured to receive the bits of the second weight generated in the first adder stage; and
      an AND gate configured to receive the first and second bits of the first weight, the AND gate configured to generate a carry-in bit for the adder.

* * * * *